US010390268B2

(12) United States Patent
Shen

(10) Patent No.: US 10,390,268 B2
(45) Date of Patent: Aug. 20, 2019

(54) METHOD AND DEVICE FOR SCHEDULING CELL QUALITY MEASUREMENTS IN A MOBILE RECEIVER

(71) Applicant: Intel IP Corporation, Santa Clara, CA (US)

(72) Inventor: Jianjun Shen, Unterhaching (DE)

(73) Assignee: Intel IP Corporation, Santa Clara, CA (US)

( * ) Notice: Subject to any disclaimer, the term of this patent is extended or adjusted under 35 U.S.C. 154(b) by 82 days.

(21) Appl. No.: 15/357,366

(22) Filed: Nov. 21, 2016

(65) Prior Publication Data

US 2017/0188274 A1    Jun. 29, 2017

(30) Foreign Application Priority Data

Dec. 23, 2015 (DE) .................. 10 2015 122 776

(51) Int. Cl.
*H04W 36/00*   (2009.01)
*H04W 36/08*   (2009.01)
*H04W 36/30*   (2009.01)
*H04W 48/16*   (2009.01)
*H04W 48/20*   (2009.01)
*H04W 72/04*   (2009.01)

(52) U.S. Cl.
CPC ... *H04W 36/0094* (2013.01); *H04W 36/0088* (2013.01); *H04W 36/08* (2013.01); *H04W 36/30* (2013.01); *H04W 48/16* (2013.01); *H04W 72/042* (2013.01); *H04W 48/20* (2013.01)

(58) Field of Classification Search
CPC ...... H04W 24/10; H04W 48/20; H04W 48/18
See application file for complete search history.

(56) References Cited

U.S. PATENT DOCUMENTS 8,942,205 B2    1/2015 Mach et al.
2007/0225051 A1    9/2007 Nader et al.
(Continued)

FOREIGN PATENT DOCUMENTS

EP    2741543 A1    6/2014
WO    WO-2009/144501 A1    12/2009

OTHER PUBLICATIONS

German Patent Office, Office Action issued for DE 10 2015 122 776.2, 8 pages, dated Jul. 5, 2016.

*Primary Examiner* — Ayaz R Sheikh
*Assistant Examiner* — Debebe A Asefa
(74) *Attorney, Agent, or Firm* — Schiff Hardin LLP

(57) ABSTRACT

A method (200) for scheduling cell quality measurements in a mobile receiver includes: receiving a downlink radio channel comprising system information (201) of a radio communication system; retrieving (202) at least one first parameter from the system information (201), the at least one first parameter specifying a criterion for performing cell quality measurements; retrieving (203) at least one second parameter from the system information (201), the at least one second parameter specifying a criterion for performing cell reselection; adapting (206) the at least one first parameter based on the at least one second parameter if the at least one first parameter is bigger than a derived threshold (205) or if the at least one first parameter is not provided (204) by the system information (201); and scheduling (207) the cell quality measurements based on the at least one adapted first parameter.

24 Claims, 7 Drawing Sheets

(56) References Cited

U.S. PATENT DOCUMENTS

2010/0216474 A1\* 8/2010 Park ............... H04W 24/10
                                              455/436
2015/0327162 A1\* 11/2015 Lee ............... H04W 48/20
                                              370/252
2016/0374000 A1\* 12/2016 Kim ............... H04W 48/20

\* cited by examiner

METHOD AND DEVICE FOR SCHEDULING CELL QUALITY MEASUREMENTS IN A MOBILE RECEIVER

FIELD

The disclosure relates to methods and devices for scheduling cell quality measurements in a mobile receiver, in particular for optimizing measurement rules for cell reselection in order to save power.

BACKGROUND

In a radio communication system 100, e.g. as illustrated in FIG. 1 a mobile station 120 (or mobile terminal or user equipment, UE) is required to perform cell measurements in Idle state according to measurement rules 102 defined in a mobile communication standard such as 3GPP specifications, and to perform cell reselection according to specified cell reselection rules so that the UE 120 can camp on the best suitable cell. However, in case that the parameters used for measurement rules are missing (optional Information Elements (IEs)) or are sub-optimal configured in System Information Blocks (SIBs) broadcast by the network, it can happen that according to the measurement rules, the UE shall perform cell measurements CM 104a, 104b, 104c, 104d, 104e, 104f, but cell reselection CR 106 will not happen for long time, according to the cell reselection rules. This can happen, especially when UE is in stationary mode or low-mobility mode. Consequently, sub-optimal configured parameters used for measurement rules have negative impact on UE's power consumption. There is a need to provide a concept for optimizing cell measurements in order to save power of the mobile device 120

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
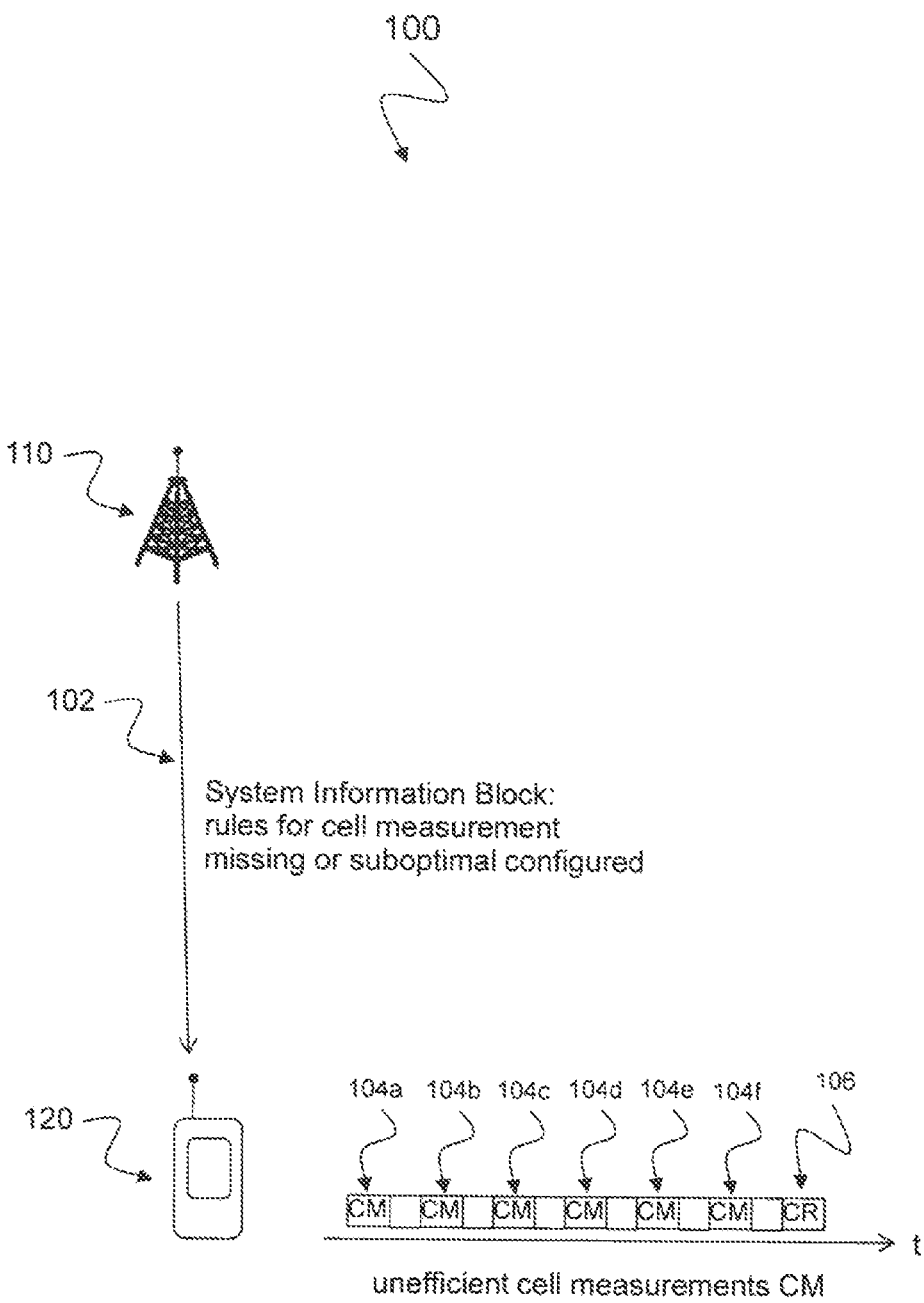
FIG. 1 is a schematic diagram illustrating a radio communication system 100 where a mobile station 120 receives measurement rules 102 for performing cell measurements.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
OFDM: Orthogonal Frequency Division Multiplex, eNB,
eNodeB: Base station,
SIB: System Information Block,
HCS: Hierarchy Cell Structure,
MBMS: Multimedia Broadcast Multicast Service,
IE: Information Element,
CPICH: Common Pilot Channel,
DCH: Dedicated Channel,
RAT: Radio Access Technology,
RSCP: Received Signal Code Power,
Ec/No: Received energy per chip divided by the power density,
DL: Downlink,
UL: Uplink.

The methods and devices described herein may be used in mobile devices and radio receivers, in particular radio receivers related to UMTS, LTE and GSM. It is understood that comments made in connection with a described method may also hold true for a corresponding device configured to perform the method and vice versa. For example, if a specific method step is described, a corresponding device may include a unit or component to perform the described method step, even if such a unit or component is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may be implemented in mobile devices (or mobile stations or User Equipments (UE)), in particular in radio receivers of such mobile devices. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices and methods described herein may be used for various wireless communication networks such as Code Division Multiple Access (CDMA), Time Division Multiple Access (TDMA) and Frequency Division Multiple Access (FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95, and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described herein may receive system information such as a system information block (SIB). Information and parameters in a SIB related to quality measurement rules and cell reselection rules are exemplary described in the 3GPP standardization documents, for example documents TS 25.101, TS 25.215, TS 25.304 and TS 25.133.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

The present disclosure describes methods and devices for scheduling cell quality measurements. In particular, the disclosure describes how the parameters used for measurement rules may be optimized by taking into account the parameters used for cell reselection rules.

When a UE is in stationary mode or low-mobility mode, the parameters used for the measurement rules may be adapted by taking into account the parameters used for the cell reselection rules. The adapted parameters lead to optimized conditions to decide if the neighbor cell measurements should be enabled or disabled.

The unnecessary neighbor cell measurements can thus be prevented, which improves UE's battery life and hence user experience as shown in the following.

Figure 2:
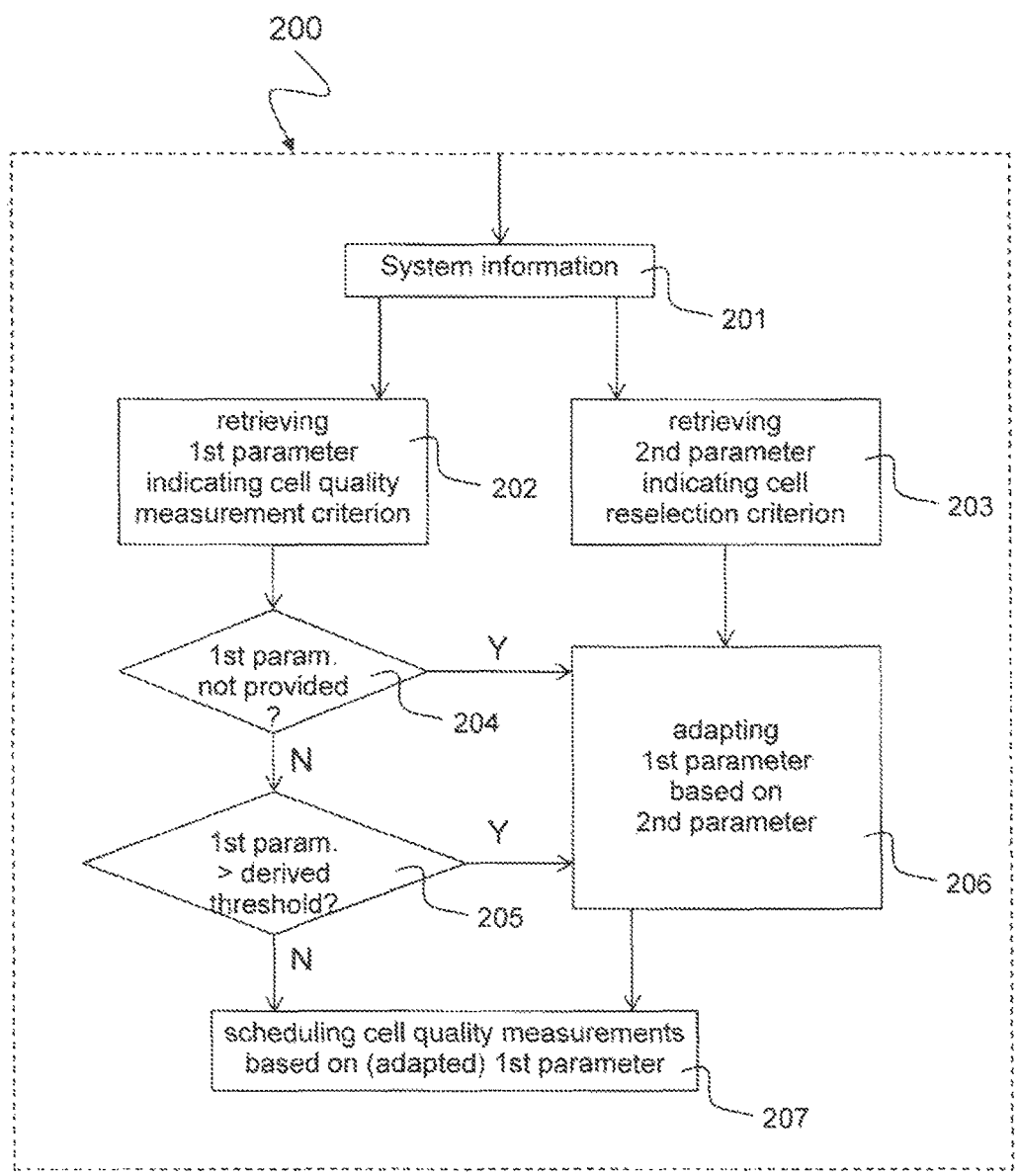
FIG. 2 schematically illustrates an exemplary method 200 for scheduling cell quality measurements in a mobile receiver.

FIG. 2 schematically illustrates an exemplary method 200 for scheduling cell quality measurements in a mobile receiver.

The method 200 includes receiving a downlink radio channel including system information 201 of a radio communication system. The method 200 further includes retrieving 202 at least one first parameter from the system information 201 which specifies a criterion for performing cell quality measurements. The method 200 further includes retrieving 203 at least one second parameter from the system information 201 which specifies a criterion for performing cell reselection. The method 200 further includes adapting 206 the at least one first parameter based on the at least one second parameter if the at least one first parameter is bigger than a derived threshold 205 or if the at least one first parameter is not provided 204 by the system information 201. The method 200 further includes scheduling 207 the cell quality measurements based on the at least one adapted first parameter.

That means the first parameter may be reconstructed by adaptation of the second parameter if the first parameter is not available.

The at least one first parameter may be one or more parameters retrieved from cell measurement rules, i.e. cell quality measurement rules, which may be configured in the system information, for example one or more system information blocks according to 3GPP. The at least one second parameter may be one or more parameters retrieved from cell reselection rules which may be configured in the system information, for example one or more system information blocks according to 3GPP.

The cell quality measurements may include inter-frequency measurements, intra-frequency measurements, inter-Radio-Access-Technology (inter-RAT) measurements, priority-based inter-frequency measurements or priority-based inter-RAT measurements.

The method 200 may further include initiating the cell quality measurements in an idle state of the mobile receiver.

The method 200 may further include: retrieving 202 the at least one first parameter from a first set of information elements in one or more system information blocks of the downlink radio channel; and retrieving 203 the at least one second parameter from a second set of information elements in one or more system information blocks of the downlink radio channel.

Scheduling 207 the cell quality measurements may include initiating the cell quality measurements if the at least one first parameter is bigger than a derived threshold 205, or if the at least one first parameter is not provided 204 by the system information 201. Not provided means that it is not configured or missing in the system information.

The term "bigger than a derived threshold" means that the at least one first parameter is bigger than a threshold, e.g. a threshold derived from the at least one second parameter or that the at least one first parameter is sub-optimal compared with the derived threshold.

The first parameter may indicate a threshold such as Sintrasearch as described below with respect to FIGS. 3 to 5 of a cell reselection quality measure, e.g. Squal as described below with respect to FIGS. 3 to 5 for triggering cell reselection.

The method 200 may further include: adapting the threshold Sintrasearch based on a cell-ranking criterion, e.g. Rs as described below with respect to FIGS. 3 to 5 for a serving cell and a cell-ranking criterion, e.g. Rn as described below with respect to FIGS. 3 to 5 for one or more neighbor cells.

The method 200 may further include: initiating a cell reselection to the one or more neighbor cells if the cell-ranking criterion Rn for a particular neighbor cell is higher than the cell-ranking criterion Rs for the serving cell.

The method 200 may further include: adapting the threshold Sintrasearch based on at least one of the following second parameters: a minimum cell quality level, e.g. Qqualmin as described below, an offset value for the particular neighbor cell, e.g. Qoffsets,n as described below, and a hysteresis value for the serving cell, e.g. Qhysts as described below.

The method 200 may further include: receiving a downlink pilot channel, e.g. a DL pilot channel 301 as described below with respect to FIG. 3; and generating 303 a cell quality measure, e.g. Qmeas as described below based on the received downlink pilot channel 301.

The method 200 may further include: generating 303 the cell quality measure, e.g. Qmeas as described below based on a signal to noise measurement or based on a power measurement of the received downlink pilot channel 301 as described below with respect to FIGS. 3 to 5.

The method 200 may further include: generating 306 the cell reselection quality measure, e.g. Squal as described below based on the cell quality measure Qqualmeas and the minimum cell quality level Qqualmin.

The method 200 may further include: generating 303 the cell quality measure Qmeas for the serving cell (named as Qmeas,s for the serving cell); and generating 303 the cell quality measure Qmeas for the particular neighbor cell (named as Qmeas,n for the neighbor cell), e.g. as described below with respect to FIGS. 3 to 5.

The method 200 may further include: generating the cell-ranking criterion Rs for the serving cell based on the cell quality measure Qmeas,s for the serving cell, e.g. as described below with respect to FIGS. 3 to 5; and generating the cell-ranking criterion Rn for the particular neighbor cell based on the cell quality measure Qmeas,n for the particular neighbor cell, e.g. as described below with respect to FIGS. 3 to 5.

The method 200 may further include: generating the cell-ranking criterion Rs for the serving cell further based on the hysteresis value Qhysts for the serving cell, e.g. as described below with respect to FIGS. 3 to 5; and generating the cell-ranking criterion Rn for the particular neighbor cell further based on the offset value Qoffsets,n for the particular neighbor cell, e.g. as described below with respect to FIGS. 3 to 5.

The method 200 may further include: generating the cell-ranking criterion Rs for the serving cell based the following relation: Rs=Qmeas,s+Qhysts, where Qmeas,s is the cell quality measure for the serving cell and Qhysts is the hysteresis value for the serving cell, e.g. as described below with respect to FIGS. 4 and 5; and generating the cell-ranking criterion Rn for the at least one neighbor cell based on the following relation: Rn=Qmeas, n−Qoffsets, n, where Qmeas, n is the cell quality measure for the at least one neighbor cell and Qoffsets, n is the offset value for the at least one neighbor cell, e.g. as described below with respect to FIGS. 4 and 5.

According to UMTS 3GPP specification, a UE in Idle state (and other no DCH states) is required to perform cell measurements needed to support cell reselection. The UE shall only consider those cells the UE is mandated to measure according to the measurement rules. Based on the measurement result, the UE shall perform ranking cells and if a cell is ranked as the best suitable cell according to the cell reselection criteria, the UE shall reselect to this cell. For example, one of the measurement and reselection rules is specified as follows:

A) Measurement rules for cell reselection when HCS is not used

If Squal<=Sintrasearch, perform intra-frequency measurements.

If Sintrasearch is not sent for serving cell, perform intra-frequency measurements, where:

Squal=Qqualmeas−Qqualmin, is the cell selection quality value

Qqualmeas is the measured quality value

Qqualmin is the minimum required quality level in the cell, range (−24 . . . 0)

Sintrasearch specifies the threshold for intra-frequency measurements, range (−32 . . . 20).

Another example of the measurement and reselection rules is specified as follows:

B) Cell reselection Criteria when HCS is not used and MBMS PL is not indicated. The cell-ranking criterion R is defined as follows:

Rs=Qmeas,s+Qhysts

Rn=Qmeas,n−Qoffsets,n, where:

Rs is the cell-ranking criterion R for serving cell

Rn is the cell-ranking criterion R for neighbor cell

Qmeas is the measured quality value

Qhysts specifies the hysteresis value, range (0 . . . 40)

Qoffsets,n specifies the offset between two cells, range (−50 . . . 50)

If a neighbor cell is ranked as the best cell, in other words, if Rn>Rs, then the UE shall perform cell reselection to this neighbor cell.

Due to the fact that the IE "Sintrasearch" is an optional information element (IE), it can happen that 1. Either this IE is not configured in SIB, which requires the UE to perform intra-frequency measurements all the time;
2. Or this IE is configured in SIB, but it could be sub-optimal configured, which causes the UE to perform intra-frequency measurements more frequently than necessary.

Figure 3:
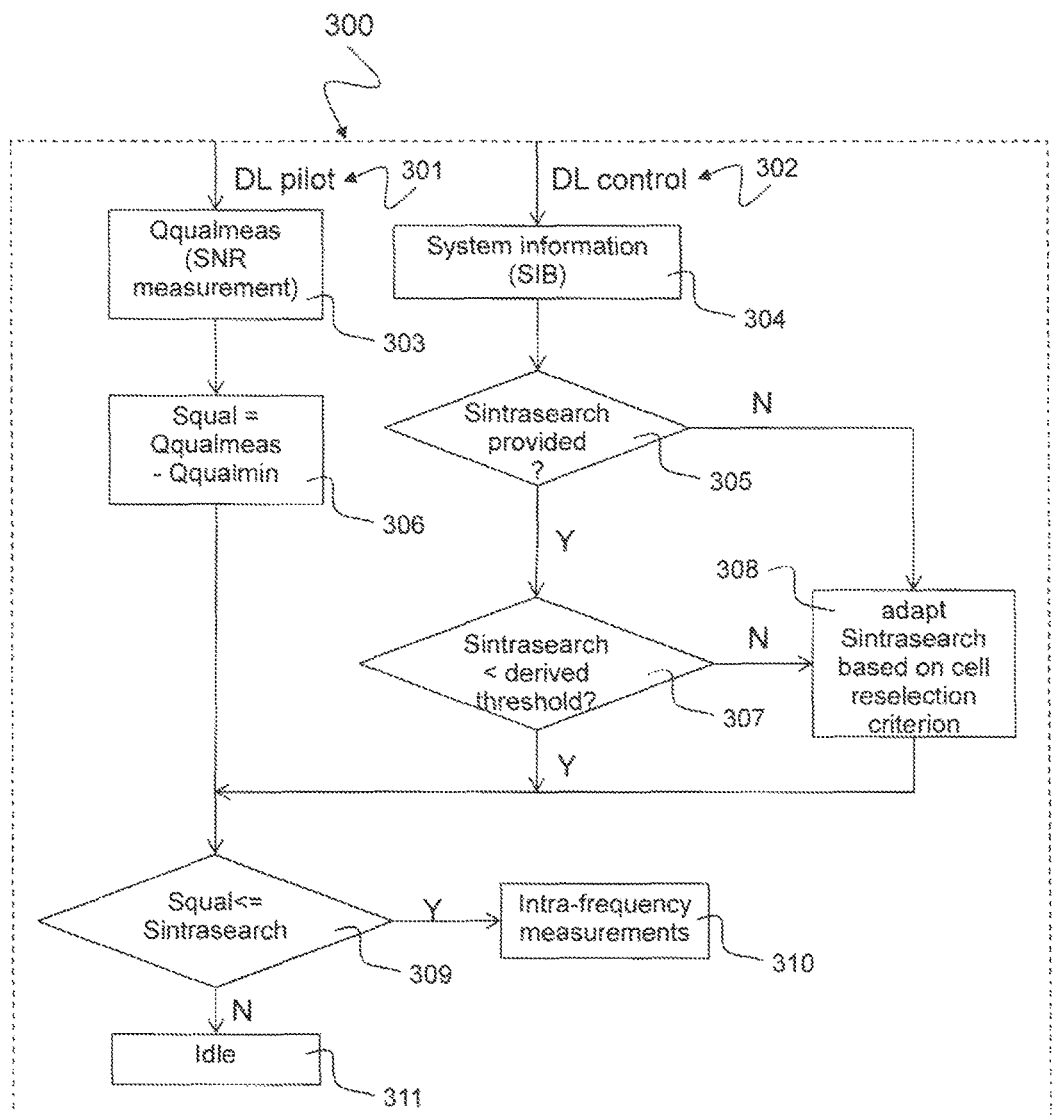
FIG. 3 schematically illustrates an exemplary method 300 for scheduling cell quality measurements based on information received from a DL pilot channel and a DL control channel.
Figure 4:
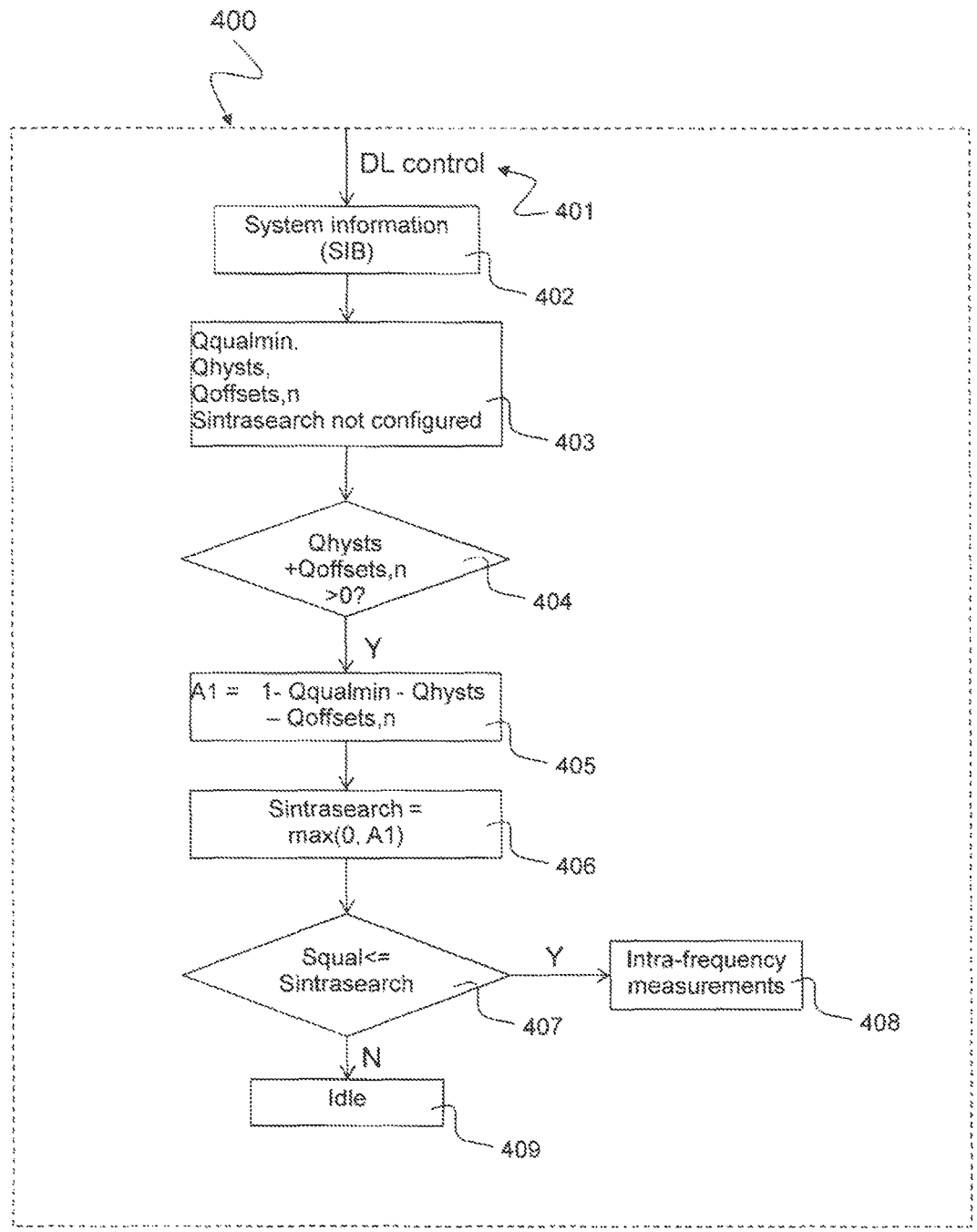
FIG. 4 schematically illustrates an exemplary method 400 for scheduling cell quality measurements when a threshold parameter for performing cell quality measurements is not provided in a system information block.
Figure 5:
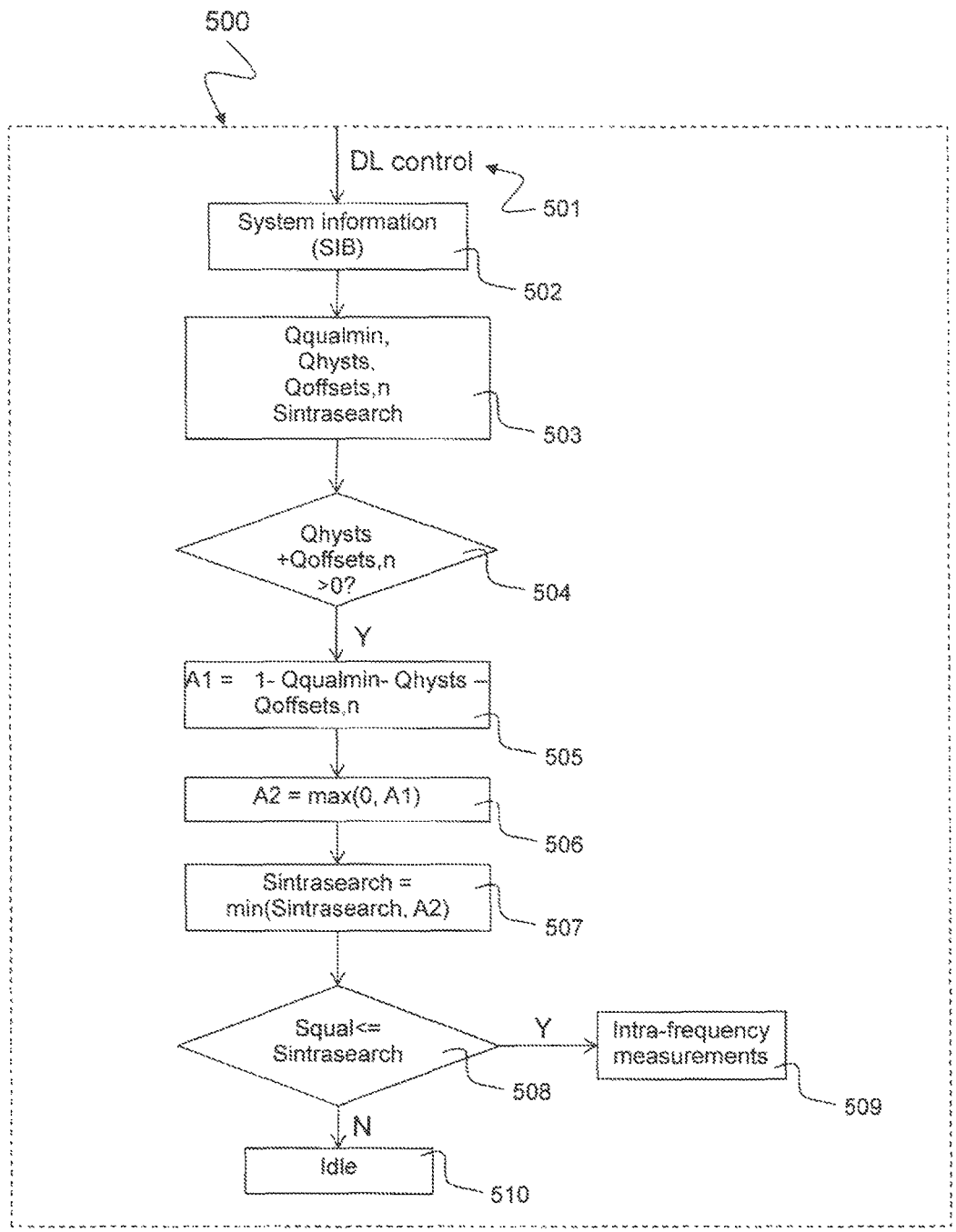
FIG. 5 schematically illustrates an exemplary method 500 for scheduling cell quality measurements when a threshold parameter for performing cell quality measurements is provided in a system information block.

The following examples described below with respect to FIGS. 3 to 5 illustrate these two cases and the method how the parameters used for the measurement rules can be, under certain condition, optimized by taking into account the parameters used for cell reselection criteria.

FIG. 3 schematically illustrates an exemplary method 300 for scheduling cell quality measurements based on information received from a DL pilot channel and a DL control channel.

One exemplary measurement rule is illustrated in FIG. 3: If Squal<=Sintrasearch, 309 perform intra-frequency measurements 310 else stay in idle mode 311.

Squal is the cell selection quality value and may be computed as Squal=Qqualmeas−Qqualmin 306. Qqualmeas is the measured quality value and may be determined by Ec/No measurement 303 based on a DL pilot channel 301. Qqualmin is the minimum required quality level in the cell, e.g. in the range (−24 . . . 0) and may be retrieved from a system information block (SIB).

Sintrasearch specifies the threshold for intra-frequency measurements, e.g. in the range (−32 . . . 20) and may be retrieved from the SIB 304 which is provided by the DL control channel 302. It may happen that Sintrasearch is not provided by the SIB 305, i.e. not configured in the SIB or missing, or that Sintrasearch is provided but bigger than a derived threshold 307, i.e. Sintrasearch may be too big, for example bigger than a threshold A1 derived from 203. In that case intra-frequency measurements 310 are always performed even if the UE is not moving towards a neighbor cell. In these two cases 305, 307, Sintrasearch may be adapted based on a cell reselection criterion 308. This provides an adapted value of Sintrasearch which may be used to check if Squal<=Sintrasearch, 309 and to perform intra-frequency measurements 310 only if required, thereby saving battery power in the UE.

FIG. 4 schematically illustrates an exemplary method 400 for scheduling cell quality measurements when a threshold parameter for performing cell quality measurements is not provided in a system information block.

In this example, the quality measure for cell reselection is set to CPICH Ec/No and the IEs are configured as follows:
Sintrasearch is not configured
Qqualmin=−21
Qhysts=4
Qoffsets,n=10, which is the lowest offset of all configured neighbor cells.

Since Sintrasearch is not configured, the UE is required to perform intra-frequency measurements all the time. However, a reselection can only happen if a neighbor cell is better ranked than the serving cell, in other words, if following condition becomes true:
if Rn>Rs, that means:
if Qmeas,n−Qoffsets,n>Qmeas,s+Qhysts, that means:
if Qmeas,n>Qmeas,s+(Qhysts+Qoffsets,n), that means in this example:
if Qmeas,n>Qmeas,s+(4+10)

Considering the range of the quality value (−24 . . . 0), it is clear that a reselection is only possible if the serving cell quality value is below −14 dB, i.e. if Qmeas,s<−14, in other words, if Squal<7, where Squal=Qmeas,s−Qqualmin=−14−(−21)=7. Due to this fact it is sufficient to enable intra-frequency measurements if Squal<7. Further, based on the ranking criteria, it is also clear that the precondition for the optimization, which is (Qhysts+Qoffsets,n), should be greater than 0.

So the conclusion is: if (Qhysts+Qoffsets,n)>0, the Sintrasearch can be optimized by the relation:
Sintrasearch=max(0, (−(Qhysts+Qoffsets,n)−Qqualmin+1)),
where:
max returns the largest value of the arguments
Qoffsets,n is the lowest offset of all configured intra-frequency neighbor cells.

According to the illustration in FIG. 4, the mobile terminal receives the SIB 402 from a DL control channel 401. The following parameters are retrieved 403 from the SIB 402: Qqualmin, Qhysts, Qoffsets,n, Sintrasearch is not configured in the SIB. After checking that the relation Qhysts+Qoffsets,n>0 is true 404, the term A1=1−Qqualmin−Qhysts−Qoffsets,n is calculated 405 and the above-indexed relation Sintrasearch=max(0, A1) 406 is determined. If the relation Squal<=Sintrasearch 407 is true, intra-frequency measurements are performed 408, otherwise the UE stays in idle mode 409.

FIG. 5 schematically illustrates an exemplary method 500 for scheduling cell quality measurements when a threshold parameter for performing cell quality measurements is provided in a system information block.

In this example, the quality measure for cell reselection is set to CPICH Ec/No and the IEs are configured as follows:
Sintrasearch is configured
Qqualmin=−21
Qhysts=4
Qoffsets,n=10, lowest offset of all configured neighbor cells
Sintrasearch=10

According to the measurement rules, if Squal<=Sintrasearch, i.e. if Squal<=10, the UE shall perform intra-frequency measurements. However, as in FIG. 4, with this configuration a reselection can only happen if the serving cell quality value is below −14 dB, i.e. it is sufficient to enable intra-frequency measurements if Squal<7, instead of if Squal<=10. Therefore, also in this case, if the precondition is fulfilled, i.e. if (Qhysts+Qoffsets,n)>0, the Sintrasearch can be optimized by the relation:
Sintrasearch=min(Sintrasearch, max(0, (−(Qhysts+Qoffsets,n)−Qqualmin+1))),
where:
max returns the largest value of the arguments
min returns the lowest value of the arguments
Qoffsets,n is the lowest offset of all configured intra-frequency neighbor cells.

According to the illustration in FIG. 5, the mobile terminal receives the SIB 502 from a DL control channel 501. The following parameters are retrieved 503 from the SIB 502: Qqualmin, Qhysts, Qoffsets,n, and Sintrasearch. After checking that the relation Qhysts+Qoffsets,n>0 is true 504, the first term A1=1−Qqualmin−Qhysts−Qoffsets,n is calculated 505, the second term A2=max(0, A1) is calculated 506 and the above-indexed relation Sintrasearch=min(Sintrasearch, A2) 507 is determined. If the relation Squal<=Sintrasearch 508 is true, intra-frequency measurements are performed 509, otherwise the UE stays in idle mode 510.

Consequently, the intra-frequency measurements intensity can be reduced so that the UE's battery life can be improved and hence user experience. This is of particular interest when UE is in stationary mode or low-mobility mode, since in this case the UE mostly camps on the same cell and the SIB configurations will not be changed for long time.

Figure 6:
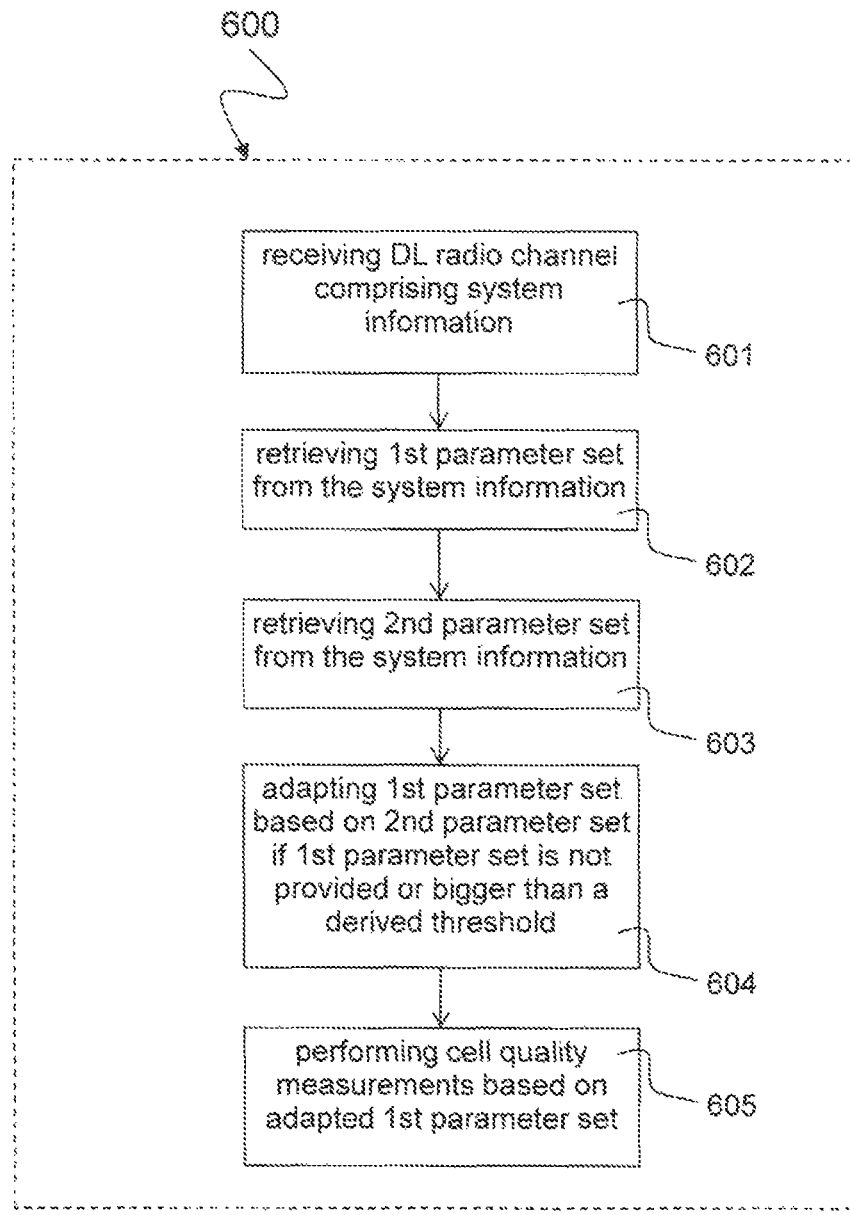
FIG. 6 schematically illustrates an exemplary method 600 for performing cell quality measurements in a mobile device.

FIG. 6 schematically illustrates an exemplary method 600 for performing cell quality measurements in a mobile device.

The method 600 includes receiving 601 a downlink radio channel comprising system information of a radio communication system, e.g. as described above with respect to FIG. 2. The method 600 further includes retrieving 602 a first parameter set from the system information which specifies cell quality measurement rules for supporting cell reselection, e.g. as described above with respect to FIG. 2 where the at least one first parameter is a parameter set including multiple first parameters. The method 600 further includes retrieving 603 a second parameter set from the system information which specifies cell reselection rules, e.g. as described above with respect to FIG. 2 where the at least one second parameter is a parameter set including multiple second parameters. The method 600 further includes adapting 604 the first parameter set based on the second parameter set if the first parameter set is bigger than a derived threshold or if the first parameter set is not provided by the system information, e.g. as described above with respect to FIG. 2. The method 600 further includes performing cell quality measurements 605 based on the adapted first parameter set.

The first parameter set may include a threshold, e.g. Sintrasearch as described above with respect to FIGS. 3 to 5, of a cell reselection quality measure, e.g. Squal as described above with respect to FIGS. 3 to 5, for triggering cell reselection.

The method 600 may further include adapting 604 the first parameter set based on a cell-ranking criterion, e.g. Rs as described above with respect to FIGS. 3 to 5, for a serving cell and a cell-ranking criterion, e.g. Rn as described above with respect to FIGS. 3 to 5, for at least one neighbor cell.

The methods described above with respect to FIGS. 2 to 6 are exemplified for intra-frequency measurements and the quality measure for cell reselection is set to CPICH Ec/No within the UMTS standard. However, the same or similar mechanism can also be applied for quality measure CPICH RSCP and for other measurement rules or other RATs:

The same mechanism can be applied for inter-frequency measurements and inter-RAT measurements, by using corresponding IEs and parameters.

For absolute priority based inter-frequency measurement rules, a similar mechanism can be applied for inter-frequencies with equal or lower priority:

Sprioritysearch1=min(Sprioritysearch1, Threshserving,low)
Sprioritysearch2=min(Sprioritysearch2, Threshserving, low2)

For absolute priority based inter-RAT measurement rules, a similar mechanism can be applied for inter-RAT layers with lower priority:

Sprioritysearch1=min(Sprioritysearch1, Threshserving,low)
Sprioritysearch2=min(Sprioritysearch2, Threshserving, low2).

Figure 7:
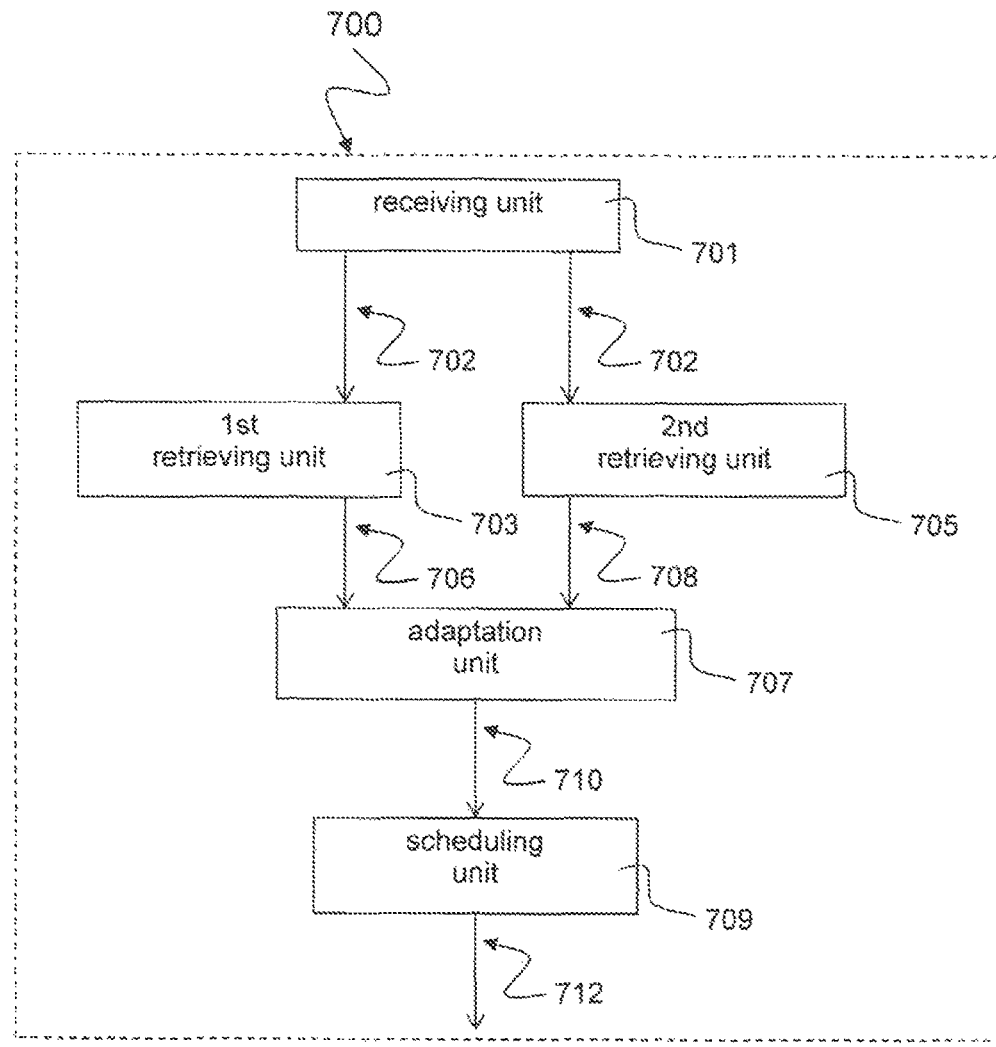
FIG. 7 is a block diagram illustrating main components of a scheduling device (or scheduling system) 700 for scheduling cell quality measurements in a mobile receiver.

FIG. 7 is a block diagram illustrating main components of a scheduling device (or scheduling system) 700 for scheduling cell quality measurements in a mobile receiver. The scheduling device (or scheduling system) 700 includes a receiving unit (or receiver) 701, a first retrieving unit (or component) 703, a second retrieving unit 705, an adaptation unit 707 and a scheduling unit 709. It is to be noted that the term "unit" as used herein has the same meaning as the term "component", which could thus be used to replace the term "unit". Further, it is to be noted that the first and second retrieving units 703 and 705 may be combined in one unit or component which performs the tasks of both retrieving units 703 and 705.

The receiver 701 receives a downlink radio channel comprising system information 702 of a radio communication system, e.g. as described above with respect to FIGS. 2 to 6.

The first retrieving unit 703 retrieves at least one first parameter 706 from the system information 702. The at least one first parameter 706 specifies a criterion for performing cell quality measurements. The second retrieving unit 705 retrieves at least one second parameter 708 from the system information 702. The at least one second parameter 708 specifies a criterion for performing cell reselection.

The adaptation unit 707 adapts the at least one first parameter 706 based on the at least one second parameter 708 if the at least one first parameter 706 is bigger than a derived threshold or if the at least one first parameter 706 is not provided by the system information 702, e.g. as described above with respect to FIGS. 2 to 6. The scheduling unit 709 schedules the cell quality measurements 712 based on the at least one adapted first parameter 710.

The first parameter 706 may include a threshold, e.g. Sintrasearch as described above with respect to FIGS. 2 to 5, of a cell reselection quality measure, e.g. Squal as described above with respect to FIGS. 2 to 5, for triggering cell reselection.

The adaptation unit 707 may adapt the at least one first parameter 706 based on at least one of the following second parameters: a minimum cell quality level, e.g. Qqualmin as described above, an offset value, e.g. Qoffsets,n as described above for the at least one neighbor cell, and a hysteresis value, e.g. Qhysts as described above for the serving cell. It is to be noted that the first and second receiving units 703, 705, the adaption unit 707 and the scheduling unit 709 may all be implemented in a processing component which performs all the tasks of the respective units 703, 705, 707 and 709.

EXAMPLES

The following examples pertain to further embodiments. Example 1 is a method for scheduling cell quality measurements in a mobile receiver, the method comprising: receiving a downlink radio channel comprising system information of a radio communication system; retrieving at least one first parameter from the system information, the at least one first parameter specifying a criterion for performing cell quality measurements; retrieving at least one second parameter from the system information, the at least one second parameter specifying a criterion for performing cell reselection; adapting the at least one first parameter based on the at least one second parameter if the at least one first parameter is bigger than a derived threshold or the at least one first parameter is not provided by the system information; and scheduling the cell quality measurements based on the at least one adapted first parameter.

In Example 2, the subject matter of Example 1 can optionally include that the cell quality measurements comprise at least one of the following: inter-frequency measurements, intra-frequency measurements, inter-Radio-Access-Technology (inter-RAT) measurements, priority-based inter-frequency measurements, priority-based inter-RAT measurements.

In Example 3, the subject matter of any one of Examples 1-2 can optionally include initiating the cell quality measurements in an idle state of the mobile receiver.

In Example 4, the subject matter of any one of Examples 1-3 can optionally include retrieving the at least one first parameter from a first set of information elements in at least one system information block of the downlink radio channel; and retrieving the at least one second parameter from a second set of information elements in at least one system information block of the downlink radio channel.

In Example 5, the subject matter of any one of Examples 1-4 can optionally include that scheduling the cell quality measurements comprises: initiating the cell quality measurements if the at least one first parameter is bigger than a derived threshold, or the at least one first parameter is not provided by the system information.

In Example 6, the subject matter of any one of Examples 1-5 can optionally include that the derived threshold is derived from the at least one second parameter.

In Example 7, the subject matter of any one of Examples 1-6 can optionally include that the at least one first parameter specifies a threshold of a cell reselection quality measure for triggering cell reselection.

In Example 8, the subject matter of Example 7 can optionally include adapting the threshold based on a cell-ranking criterion for a serving cell and a cell-ranking criterion for at least one neighbor cell.

In Example 9, the subject matter of Example 8 can optionally include initiating a cell reselection to the at least one neighbor cell if the cell-ranking criterion for the at least one neighbor cell is higher than the cell-ranking criterion for the serving cell.

In Example 10, the subject matter of any one of Examples 8-9 can optionally include adapting the threshold based on at least one of the following second parameters: a minimum cell quality level, an offset value for the at least one neighbor cell, and a hysteresis value for the serving cell.

In Example 11, the subject matter of Example 10 can optionally include: receiving a downlink pilot channel; and generating a cell quality measure based on the received downlink pilot channel.

In Example 12, the subject matter of Example 11 can optionally include generating the cell quality measure based on at least one of a signal to noise measurement or a power measurement of the received downlink pilot channel.

In Example 13, the subject matter of Example 12 can optionally include generating the cell reselection quality measure based on the cell quality measure and the minimum cell quality level.

In Example 14, the subject matter of any one of Examples 11-13 can optionally include: generating the cell quality measure for the serving cell; and generating the cell quality measure for the at least one neighbor cell.

In Example 15, the subject matter of Example 14 can optionally include: generating the cell-ranking criterion for the serving cell based on the cell quality measure for the serving cell; and generating the cell-ranking criterion for the at least one neighbor cell based on the cell quality measure for the at least one neighbor cell.

In Example 16, the subject matter of Example 15 can optionally include: generating the cell-ranking criterion for the serving cell further based on the hysteresis value for the serving cell; and generating the cell-ranking criterion for the at least one neighbor cell further based on the offset value for the at least one neighbor cell.

In Example 17, the subject matter of Example 16 can optionally include: generating the cell-ranking criterion Rs for the serving cell based the following relation: $Rs=Q_{meas,s}+Q_{hyst,s}$, where $Q_{meas,s}$ is the cell quality measure for the serving cell and $Q_{hyst,s}$ is the hysteresis value for the serving cell; and generating the cell-ranking criterion Rn for the at least one neighbor cell based on the following relation: $Rn=Q_{meas,n}-Q_{offset,n}$, where $Q_{meas,n}$ is the cell quality measure for the at least one neighbor cell and $Q_{offset,n}$ is the offset value for the at least one neighbor cell.

Example 18 is a method for performing cell quality measurements in a mobile device, the method comprising: receiving a downlink radio channel comprising system information of a radio communication system; retrieving a first parameter set from the system information, the first parameter set specifying cell quality measurement rules for supporting cell reselection; retrieving a second parameter set from the system information, the second parameter set specifying cell reselection rules; adapting the first parameter set based on the second parameter set if the first parameter set is bigger than a derived threshold or if the first parameter set is not provided by the system information; and performing cell quality measurements based on the adapted first parameter set.

In Example 19, the subject matter of Example 18 can optionally include that the first parameter set comprises a search threshold of a cell reselection quality measure for triggering cell reselection.

In Example 20, the subject matter of any one of Examples 18-19 can optionally include: adapting the first parameter set based on a cell-ranking criterion for a serving cell and a cell-ranking criterion for at least one neighbor cell.

Example 21 is a scheduling device (or scheduling system) for scheduling cell quality measurements in a mobile receiver, the scheduling device (or scheduling system) comprising: a receiver configured to receive a downlink radio channel comprising system information of a radio communication system; a retrieving component configured to retrieve at least one first parameter from the system information, the at least one first parameter specifying a criterion for performing cell quality measurements, and configured to retrieve at least one second parameter from the system information, the at least one second parameter specifying a criterion for performing cell reselection; an adaptation unit configured to adapt the at least one first parameter based on the at least one second parameter if the at least one first parameter is bigger than a derived threshold or if the at least one first parameter is not provided by the system information; and a scheduling unit configured to schedule the cell quality measurements based on the at least one adapted first parameter.

In Example 22, the subject matter of Example 21 can optionally include that the first parameter comprises a search threshold of a cell reselection quality measure for triggering cell reselection.

In Example 23, the subject matter of any one of Examples 21-22 can optionally include that the adaptation unit is further configured to adapt the at least one first parameter based on at least one of the following second parameters: a minimum cell quality level, an offset value for the at least one neighbor cell, and a hysteresis value for the serving cell.

Example 24 is a computer readable non-transitory medium on which computer instructions are stored which when executed by a computer, cause the computer to perform the method of one of Examples 1 to 20.

Example 25 is a device for scheduling cell quality measurements in a mobile receiver, the device comprising: means for receiving a downlink radio channel comprising system information of a radio communication system; means for retrieving at least one first parameter from the system information, the at least one first parameter specifying a criterion for performing cell quality measurements; means for retrieving at least one second parameter from the system information, the at least one second parameter specifying a criterion for performing cell reselection; means for adapting the at least one first parameter based on the at least one second parameter if the at least one first parameter is bigger than a derived threshold or the at least one first parameter is not provided by the system information; and means for scheduling the cell quality measurements based on the at least one adapted first parameter.

In Example 26, the subject matter of Example 25 can optionally include that the cell quality measurements comprise at least one of the following: inter-frequency measurements, intra-frequency measurements, inter-Radio-Access-Technology (inter-RAT) measurements, priority-based inter-frequency measurements, priority-based inter-RAT measurements.

In Example 27, the subject matter of any one of Examples 25-26 can optionally include means for initiating the cell quality measurements in an idle state of the mobile receiver.

In Example 28, the subject matter of any one of Examples 25-27 can optionally include means for retrieving the at least one first parameter from a first set of information elements in at least one system information block of the downlink radio channel; and means for retrieving the at least one second parameter from a second set of information elements in at least one system information block of the downlink radio channel.

In Example 29, the subject matter of any one of Examples 25-28 can optionally include that the means for scheduling the cell quality measurements comprises: means for initiating the cell quality measurements if the at least one first parameter is bigger than a derived threshold, or the at least one first parameter is not provided by the system information.

In Example 30, the subject matter of any one of Examples 25-29 can optionally include that the derived threshold is derived from the at least one second parameter.

In Example 31, the subject matter of any one of Examples 25-30 can optionally include that the at least one first parameter specifies a threshold of a cell reselection quality measure for triggering cell reselection.

In Example 32, the subject matter of Example 31 can optionally include means for adapting the threshold based on a cell-ranking criterion for a serving cell and a cell-ranking criterion for at least one neighbor cell.

In Example 33, the subject matter of Example 32 can optionally include means for initiating a cell reselection to the at least one neighbor cell if the cell-ranking criterion for the at least one neighbor cell is higher than the cell-ranking criterion for the serving cell.

In Example 34, the subject matter of any one of Examples 32-33 can optionally include means for adapting the threshold based on at least one of the following second parameters: a minimum cell quality level, an offset value for the at least one neighbor cell, and a hysteresis value for the serving cell.

In Example 35, the subject matter of Example 34 can optionally include: means for receiving a downlink pilot channel; and means for generating a cell quality measure based on the received downlink pilot channel.

In Example 36, the subject matter of Example 35 can optionally include means for generating the cell quality measure based on at least one of a signal to noise measurement or a power measurement of the received downlink pilot channel.

In Example 37, the subject matter of Example 36 can optionally include means for generating the cell reselection quality measure based on the cell quality measure and the minimum cell quality level.

In Example 38, the subject matter of any one of Examples 35-37 can optionally include: means for generating the cell quality measure for the serving cell; and means for generating the cell quality measure for the at least one neighbor cell.

In Example 39, the subject matter of Example 38 can optionally include: means for generating the cell-ranking criterion for the serving cell based on the cell quality measure for the serving cell; and means for generating the cell-ranking criterion for the at least one neighbor cell based on the cell quality measure for the at least one neighbor cell.

In Example 40, the subject matter of Example 39 can optionally include: means for generating the cell-ranking criterion for the serving cell further based on the hysteresis value for the serving cell; and means for generating the cell-ranking criterion for the at least one neighbor cell further based on the offset value for the at least one neighbor cell.

In Example 41, the subject matter of Example 40 can optionally include: means for generating the cell-ranking criterion Rs for the serving cell based the following relation: Rs=Qmeas,s+Qhysts, where Qmeas,s is the cell quality measure for the serving cell and Qhysts is the hysteresis value for the serving cell; and means for generating the cell-ranking criterion Rn for the at least one neighbor cell based on the following relation: Rn=Qmeas,n−Qoffsets,n, where Qmeas,n is the cell quality measure for the at least one neighbor cell and Qoffsets,n is the offset value for the at least one neighbor cell.

Example 42 is a circuit for performing cell quality measurements in a mobile device, the circuit comprising: means for receiving a downlink radio channel comprising system information of a radio communication system; means for retrieving a first parameter set from the system information, the first parameter set specifying cell quality measurement rules for supporting cell reselection; means for retrieving a second parameter set from the system information, the second parameter set specifying cell reselection rules; means for adapting the first parameter set based on the second parameter set if the first parameter set is bigger than a derived threshold or if the first parameter set is not provided by the system information; and means for performing cell quality measurements based on the adapted first parameter set.

In Example 43, the subject matter of Example 42 can optionally include that the first parameter set comprises a search threshold of a cell reselection quality measure for triggering cell reselection.

In Example 44, the subject matter of any one of Examples 42-43 can optionally include: means for adapting the first parameter set based on a cell-ranking criterion for a serving cell and a cell-ranking criterion for at least one neighbor cell.

Example 45 is a scheduling system for scheduling cell quality measurements in a mobile receiver, the scheduling system comprising: a receiving subsystem configured to receive a downlink radio channel comprising system information of a radio communication system; a first retrieving subsystem configured to retrieve at least one first parameter from the system information, the at least one first parameter specifying a criterion for performing cell quality measurements; a second retrieving subsystem configured to retrieve at least one second parameter from the system information, the at least one second parameter specifying a criterion for performing cell reselection; an adaptation subsystem configured to adapt the at least one first parameter based on the at least one second parameter if the at least one first parameter is bigger than a derived threshold or if the at least one first parameter is not provided by the system information; and a scheduling subsystem configured to schedule the cell quality measurements based on the at least one adapted first parameter.

In Example 46, the subject matter of Example 45 can optionally include that the first parameter comprises a search threshold of a cell reselection quality measure for triggering cell reselection.

In Example 47, the subject matter of any one of Examples 45-46 can optionally include that the adaptation subsystem is further configured to adapt the at least one first parameter based on at least one of the following second parameters: a minimum cell quality level, an offset value for the at least one neighbor cell, and a hysteresis value for the serving cell.

In Example 48, the subject matter of any one of Examples 45-47 can optionally include that the scheduling system is an on-chip system.

Example 49 is a scheduling device (or scheduling system) for scheduling cell quality measurements in a mobile receiver, the scheduling device (or scheduling system) comprising: a receiver configured to receive a downlink radio channel comprising system information of a radio communication system; and a processing component configured to retrieve at least one first parameter from the system information, the at least one first parameter specifying a criterion for performing cell quality measurements; to retrieve at least one second parameter from the system information, the at least one second parameter specifying a criterion for performing cell reselection; to adapt the at least one first parameter based on the at least one second parameter if the at least one first parameter is bigger than a derived threshold or if the at least one first parameter is not provided by the system information; and to schedule the cell quality measurements based on the at least one adapted first parameter.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for scheduling cell quality measurements in a mobile device, the method comprising:
    receiving a downlink radio channel comprising system information of a radio communication system;
    retrieving one or more first parameters from the system information, wherein at least one of the one or more first parameters specifies a first threshold value associated with performing cell quality measurements;
    retrieving one or more second parameters from the system information, wherein at least one of the one or more second parameters specifies a second threshold value associated with performing cell reselection;
    adapting the first threshold value to an adapted threshold value by:
        (i) when the first threshold value is larger than the second threshold value, selectively converting the first threshold value to the adapted threshold value based on the at least one of the one or more second parameters, and (ii) when the first threshold value is null or less than or equal to the second threshold value, determining the adapted threshold value based on the the one or more second parameters; and
    scheduling the cell quality measurements based on the adapted threshold value.

2. The method of claim 1, wherein the cell quality measurements comprise the following:
    inter-frequency measurements,
    intra-frequency measurements,
    inter-Radio-Access-Technology (inter-RAT) measurements,
    priority-based inter-frequency measurements,
    priority-based inter-RAT measurements.

3. The method of claim 1, comprising:
    initiating the cell quality measurements in an idle state of the mobile receiver.

4. The method of claim 1, comprising:
    retrieving at least one of the one or more first parameters from a first set of information elements in at least one system information block of the downlink radio channel; and
    retrieving at least one of the one or more second parameters from a second set of information elements in at least one system information block of the downlink radio channel.

5. The method of claim 1, wherein scheduling the cell quality measurements comprises:
    initiating the cell quality measurements if the adapted threshold value is larger than a cell reselection quality measure.

6. The method of claim 1, wherein the second threshold value is derived from the one or more second parameters.

7. The method of claim 1, comprising:
    adapting the first threshold value based on a cell-ranking criterion for a serving cell and a cell-ranking criterion for at least one neighbor cell.

8. The method of claim 7, comprising:
    initiating a cell reselection to the at least one neighbor cell if the cell-ranking criterion for the at least one neighbor cell is higher than the cell-ranking criterion for the serving cell.

9. The method of claim 7, comprising:
    adapting the first threshold value based on at least one of the following one or more second parameters:
        a minimum cell quality level,
        an offset value for the at least one neighbor cell, and
        a hysteresis value for the serving cell.

10. The method of claim 9, comprising:
    receiving a downlink pilot channel; and
    generating a cell quality measure based on the received downlink pilot channel.

11. The method of claim 10, comprising:
    generating the cell quality measure based on at least one of a signal to noise measurement or a power measurement of the received downlink pilot channel.

12. The method of claim 11, comprising:
    generating the cell reselection quality measure based on the cell quality measure and the minimum cell quality level.

13. The method of claim 10, comprising:
    generating the cell quality measure for the serving cell; and
    generating the cell quality measure for the at least one neighbor cell.

14. The method of claim 13, comprising:
    generating the cell-ranking criterion for the serving cell based on the cell quality measure for the serving cell; and
    generating the cell-ranking criterion for the at least one neighbor cell based on the cell quality measure for the at least one neighbor cell.

15. The method of claim 14, comprising:
    generating the cell-ranking criterion for the serving cell further based on the hysteresis value for the serving cell; and
    generating the cell-ranking criterion for the at least one neighbor cell further based on the offset value for the at least one neighbor cell.

16. The method of claim 15, comprising:
generating the cell-ranking criterion Rs for the serving cell based the following relation: Rs=Qmeas,s+Qhysts, where Qmeas,s is the cell quality measure for the serving cell and Qhysts is the hysteresis value for the serving cell; and
generating the cell-ranking criterion Rn for the at least one neighbor cell based on the following relation: Rn=Qmeas,n−Qoffsets,n, where Qmeas,n is the cell quality measure for the at least one neighbor cell and Qoffsets,n is the offset value for the at least one neighbor cell.

17. The method of claim 1, wherein the act of adapting the first threshold value to an adapted threshold value includes, when the first threshold value is null, reconstructing the first threshold value using the at least one of the one or more second parameters.

18. A method for performing cell quality measurements in a mobile device, the method comprising:
receiving a downlink radio channel comprising system information of a radio communication system;
retrieving a first parameter set from the system information, the first parameter set specifying a first threshold value associated with performing cell quality measurement;
retrieving a second parameter set from the system information, the second parameter set specifying cell reselection rules;
adapting the first threshold value to an adapted threshold value by:
 (i) when the first threshold value is larger than a second threshold value associated with performing cell reselection as indicated by the second parameter set, selectively convert the first threshold value to an adapted threshold value based upon the second parameter set, and
 (ii) when the first threshold value is null or less than or equal to the second threshold value, determining the adapted threshold value based on the second parameter set; and
performing cell quality measurements based on the adapted threshold value.

19. The method of claim 18, wherein the first parameter set comprises a search threshold value of a cell reselection quality measure for triggering cell reselection.

20. The method of claim 18, comprising:
adapting the first parameter set based on a cell-ranking criterion for a serving cell and a cell-ranking criterion for at least one neighbor cell.

21. The scheduling system of claim 20, wherein the adaptation component is further configured to adapt the first threshold value based on the at least one second parameter, including:
a minimum cell quality level,
an offset value for the at least one neighbor cell, and
a hysteresis value for the serving cell.

22. A scheduling system adapted for scheduling cell quality measurements in a mobile receiver, the scheduling system comprising:

a receiver configured to receive a downlink radio channel comprising system information of a radio communication system;
a retrieving component configured to retrieve at least one first parameter from the system information, the at least one first parameter specifying a first threshold value associated with performing cell quality measurements, and to retrieve at least one second parameter from the system information, the at least one second parameter specifying a second threshold value associated with performing cell reselection; and
an adaptation component configured to adapt the first threshold value to an adapted threshold value based on the at least one second parameter by:
 (i) when the at least first threshold value is larger than the second threshold value, selectively convert the first threshold value to the adapted-threshold value based upon at least one second parameter, and
 (ii) when the at least one first parameter is null or less than or equal to the second threshold value, determining the adapted threshold value based on the at least one second parameter; and
a scheduling component configured to schedule the cell quality measurements based on the adapted threshold value.

23. The scheduling system of claim 22, wherein the at least one first parameter comprises a search threshold of a cell reselection quality measure for triggering cell reselection.

24. A scheduling system adapted for scheduling cell quality measurements in a mobile device, the scheduling system comprising:
a receiver configured to receive a downlink radio channel comprising system information of a radio communication system; and
a processing component configured to:
retrieve at least one first parameter from the system information, the at least one first parameter specifying a first threshold value associated with performing cell quality measurements,
retrieve at least one second parameter from the system information, the at least one second parameter specifying a second threshold value associated with performing cell reselection,
adapt the first threshold value to an adapted threshold value based on the at least one second parameter by:
 (i) when the first threshold value is larger than the second threshold value, selectively convert the first threshold value to an adapted threshold value based on the at least one second parameter, and
 (ii) when the first threshold value is null or less than or equal to the second threshold value, determine the adapted threshold value based on the at least one second parameter; and
schedule the cell quality measurements based on the adapted threshold value.

\* \* \* \* \*